United States Patent
Shannon et al.

(10) Patent No.: US 9,475,710 B2
(45) Date of Patent: Oct. 25, 2016

(54) VERY HIGH FREQUENCY (VHF) DRIVEN ATMOSPHERIC PLASMA SOURCES AND POINT OF USE FERTIGATION OF IRRIGATION WATER UTILIZING PLASMA PRODUCTION OF NITROGEN BEARING SPECIES

(71) Applicant: North Carolina State University, Raleigh, NC (US)

(72) Inventors: Steven C. Shannon, Raleigh, NC (US); Detlef Knappe, Raleigh, NC (US); Brandon Byrns, Raleigh, NC (US); Daniel Wooten, Berkeley, CA (US); Alexander Lindsay, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 153 days.

(21) Appl. No.: 14/212,195

(22) Filed: Mar. 14, 2014

(65) Prior Publication Data

US 2014/0262789 A1    Sep. 18, 2014

Related U.S. Application Data

(60) Provisional application No. 61/786,099, filed on Mar. 14, 2013.

(51) Int. Cl.
*C02F 1/46* (2006.01)
*H05H 1/46* (2006.01)
(Continued)

(52) U.S. Cl.
CPC . *C02F 1/46* (2013.01); *C02F 1/72* (2013.01); *H05H 1/46* (2013.01); *C02F 2101/36* (2013.01);
(Continued)

(58) Field of Classification Search
None
See application file for complete search history.

(56) References Cited

U.S. PATENT DOCUMENTS

2003/0180421 A1    9/2003  Ruan et al.
2005/0178746 A1*   8/2005  Gorin ................ H01J 37/32357
                                                    219/121.43
(Continued)

FOREIGN PATENT DOCUMENTS

EP          0921713 A2      9/1999
JP          2004-268003 A   9/2004
(Continued)

OTHER PUBLICATIONS

International Search Report and Written Opinion for corresponding PCT International Patent Application No. PCT/US2014/027947, dated Jul. 28, 2014.

*Primary Examiner* — Kishor Mayekar
(74) *Attorney, Agent, or Firm* — Meunier Carlin & Curfman LLC

(57) ABSTRACT

A point of use irrigation water fertigation system utilizes plasma production of nitrogen-bearing species. Soluble nitrogen-bearing species are generated using an atmospheric air plasma treatment of an irrigation water supply. A plasma is generated by a tube having an air intake. A high frequency generator generates atmospheric plasma. The end of the tube is placed above the surface of the irrigation water supply and the plasma emanating from the tube generates nitrogen species in the water. The non-thermal plasma discharge efficiently produces highly reactive radicals and $NO_x$ species that have impact on water chemistry including inactivation of microorganisms with high efficacy and accelerated removal of persistent organic pollutants such as perfluorinated compounds (PFCs) from water samples. Plasma ignition can be initiated with a low flow of helium gas injection. Upon ignition, the gas is transitioned to a helium/room air mix, immediately followed by a transition to ambient room air only.

6 Claims, 9 Drawing Sheets

(51) Int. Cl.
*C02F 1/72* (2006.01)
*C02F 101/36* (2006.01)
*C02F 103/06* (2006.01)
*C02F 103/42* (2006.01)

(52) U.S. Cl.
CPC ........ *C02F 2103/06* (2013.01); *C02F 2103/42* (2013.01); *C02F 2303/04* (2013.01); *C02F 2305/023* (2013.01); *H05H 2001/4697* (2013.01); *H05H 2240/10* (2013.01); *H05H 2240/20* (2013.01); *H05H 2245/1225* (2013.01); *Y02W 10/37* (2015.05)

(56) References Cited

U.S. PATENT DOCUMENTS

| | | | |
|---|---|---|---|
| 2007/0029500 A1* | 2/2007 | Coulombe | H05H 1/24 250/423 F |
| 2011/0286893 A1* | 11/2011 | Zimmerman | B01J 19/0093 422/186.14 |
| 2012/0063966 A1* | 3/2012 | Liao | A61L 2/14 422/186 |

FOREIGN PATENT DOCUMENTS

| | | |
|---|---|---|
| JP | 2008-071656 A | 3/2008 |
| WO | 2012/157034 A1 | 11/2012 |

* cited by examiner

Note: $X_S = X_{S1} + X_{S2}$

VERY HIGH FREQUENCY (VHF) DRIVEN ATMOSPHERIC PLASMA SOURCES AND POINT OF USE FERTIGATION OF IRRIGATION WATER UTILIZING PLASMA PRODUCTION OF NITROGEN BEARING SPECIES

CROSS REFERENCE TO RELATED APPLICATION

This application claims the benefit of U.S. Provisional Patent Application No. 61/786,099, filed Mar. 14, 2013 and titled VHF DRIVEN ATMOSPHERIC PLASMA SOURCE AND POINT OF USE FERTIGATION OF IRRIGATION WATER UTILIZING PLASMA PRODUCTION OF NITROGEN BEARING SPECIES, the content of which is hereby incorporated herein by reference in its entirety.

TECHNICAL FIELD

The present disclosure relates to plasma sources. More particularly, the present disclosure relates to very high frequency (VHF) driven atmospheric plasma sources and point of use fertigation of irrigation water utilizing plasma production of nitrogen bearing species.

BACKGROUND

Annual investment in global water treatment infrastructure is expected to approach $90 Billion this decade. Water treatment, particularly in reclamation and treatment for re-use, is a high growth area in the water treatment market, with the percentage of recycled treated water use in US industrial markets doubling from 1985 to 2000. Further compounding this growth is the increase in industrial water usage in emerging markets, and the subsequent need for water treatment infrastructure as the percentage of water consumption for industrial markets continues to increase. Currently, chemical consumption for disinfectant and biocide treatment account for up to 15% of the water treatment chemical market, and this is expected to remain at this level through 2015.

Over 78% of the Earth's atmosphere is composed of nitrogen gas, and nitrogen is an essential nutrient for both plants and animals. Nitrogen is a major component of: chlorophyll, the compound used by plants to produce sugars from water and carbon dioxide in the presence of sunlight; amino acids, the building blocks of proteins; energy-transfer compounds such as ATP; and DNA, the genetic material that allows cells (and therefore whole plants) to grow and reproduce. Intensive agriculture and horticulture deplete nitrogen and nitrogen-producing microorganisms from the soil, and hence nitrogen needs to be replaced in order for healthy plants to grow.

Almost all nitrogen used by plants includes nitrates or ammonium compounds. Ammonium compounds are typically manufactured using the Haber-Bosch process which uses natural gas and nitrogen at high temperature and pressure to form ammonia. The ammonia is then used to produce nitrogen fertilizers such as urea and ammonium nitrate. Ammonia can also be dissolved in water and used as a fertilizer. This is known as aqua ammonia.

Fertigation is the application of fertilizers through an irrigation system. Fertigation is most commonly used to fertilize high value crops such as fruit trees, vegetables and flowers. Nitrogen is the most common substance used in fertigation.

The current global use of nitrogen fertilizer nitrogen is about 110 million tons per year. The Food and Agriculture Organization of the United Nations suggests that there will be a two to three fold increase in nitrogen fertilizer by the second half of the 21st century as diets move away from cereals, roots, tubers and pulses towards more livestock products and fruits and vegetables which require increased fertilizer use.

The world's largest consumers of nitrogen fertilizer are East Asia, South Asian, North America and Western Europe. Behind China, the United States is the second largest producer and consumer of fertilizer in the world. North America is the largest importer of nitrogen fertilizer as domestic production capacity is limited. In 2011, the US imported 10.79 million tons of nitrogen (54% of its requirements). The United States' fertilizer market was worth $19.7 billion in 2011, 33% of which comprised nitrogen fertilizer. During the five years to 2017, industry revenue is expected to increase at an average annual rate of 3.2% to $32 billion.

Like fertilizers, there is a huge global market for pesticides: Global pesticide use was $32.665 billion in 2004, with herbicides accounting for 45.4%. More than half of the world's pesticides are used in North America and Western Europe. The total herbicide use in US agriculture was 158,000 tons in 2005. The United States' pesticide industry was worth $15.4 billion in 2011, and herbicides accounted for 60% of these revenues. Over the five years to 2017, revenue is projected to grow at an average annual rate of 1.5% to $16.6 billion.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

In accordance with embodiments, point of use fertigation of irrigation water utilizing plasma production of nitrogen-bearing species is provided by a method of in-situ fertilizer production where soluble nitrogen-bearing species such as nitrates and nitrites are generated using an atmospheric air plasma (i.e., ionized gas) treatment of an irrigation water supply. In accordance with embodiments, the plasma is generated by a tube which is approximately two feet in length and three to four inches in diameter. The tube has an air intake and is connected to a high frequency (3.5 kW 162 MHz) generator. In use, the end of the tube is placed above the surface of the irrigation water supply and the plasma emanating from the tube generates nitrogen species in the water.

In accordance with embodiments, an atmospheric air plasma source includes a cylindrical tube having an air intake and an inner conduit in fluid communication with the air intake, an electrical voltage generator electrically connected to the conduit, the generator oscillating at a VHF frequency such that at least a portion of the inner conduit oscillates at the frequency, and a plasma emitting nozzle at a terminal end of the inner conduit, the nozzle recessed within the interior of the cylindrical tube from a terminal end of the cylindrical tube.

In various examples: a water sample is subjected to plasma treatment at the terminal end of the cylindrical tube; a water conveying element in fluid communication with the inner conduit conveys liquid from a liquid under treatment;

a fluid pump drives liquid along the water conveying element; a housing around the cylindrical tube has an open distal end extending beyond the terminal end of the cylindrical tube; and/or at least one floatation element is configured to provide buoyancy to the housing with the open distal end of the housing sealed with a surface of a liquid under treatment.

In accordance with embodiments, a method of treating a liquid sample includes providing an atmospheric air plasma source, and applying a plasma emitted by the plasma emitting nozzle to a surface of a liquid sample. In various examples: a plasma emitted by the plasma emitting nozzle is applied to a volume of the liquid sample below the surface; a nitrogen bearing species is generated by applying the plasma emitted by the plasma emitting nozzle to a surface of a liquid sample; water is fertigated for agricultural use; plasma ignition is initiated with a flow of helium gas injection, transitioned to a helium/room air mix, followed by a transition to ambient room air.

In accordance with embodiments, a method of treating a surface includes providing an atmospheric air plasma source, and applying a plasma emitted by a plasma emitting nozzle to the surface.

In accordance with embodiments, multiple sources run in parallel off of a common generator, a plurality of coaxial sources run simultaneously from a single power supply. This is one pathway for scale up taking advantage of a ballasting effect. Other sources can route power to the lowest impedance path to ground (arc and thermal discharges) and this makes parallel operation more difficult since all the power can have the tendency to route to one applicator. With negative feedback ballasting according to at least one embodiment described herein, distributed power to a plurality of parallel sources from a common power supply is possible.

BRIEF DESCRIPTION OF THE DRAWINGS

The foregoing aspects and other features of the present subject matter are explained in the following description, taken in connection with the accompanying drawings, wherein.

DETAILED DESCRIPTION

While the disclosure of the technology herein is presented with sufficient details to enable one skilled in this art to practice the presently disclosed subject matter, it is not intended to limit the scope of the disclosed technology. The inventors contemplate that future technologies may facilitate additional embodiments of the presently disclosed subject matter as claimed herein. Moreover, although the term "step" may be used herein to connote different aspects of methods employed, the term should not be interpreted as implying any particular order among or between various steps herein disclosed unless and except when the order of individual steps is explicitly described.

Figure 1A:
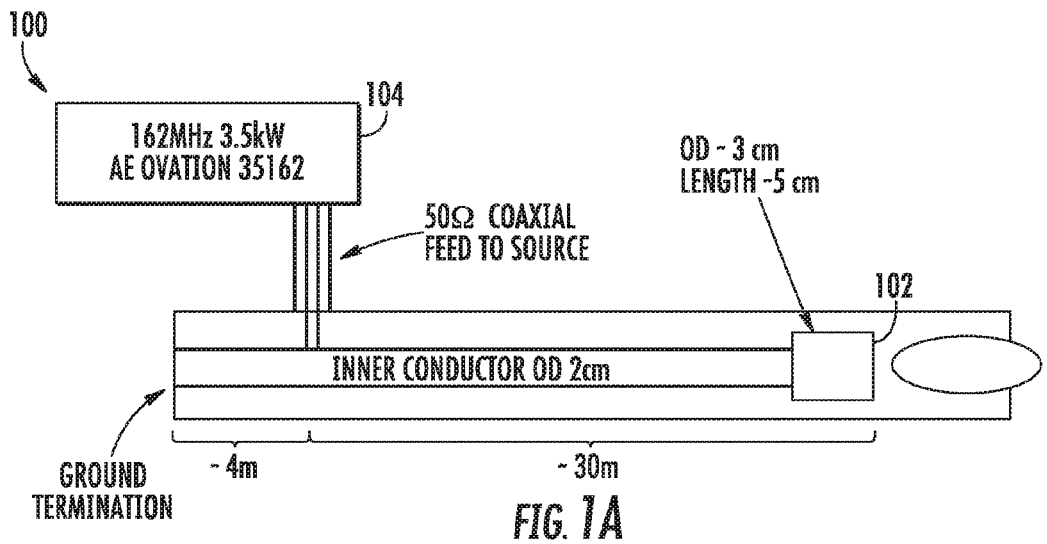
FIG. 1A depicts a schematic of a plasma source configuration in accordance with embodiments of the present disclosure.
Figure 1B:
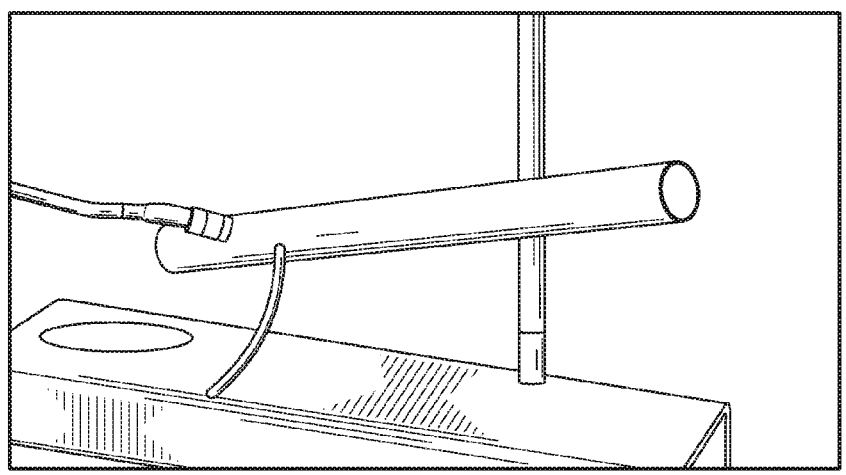
FIG. 1B is an image of a plasma source assembly in accordance with FIG. 1A.
Figure 1C:
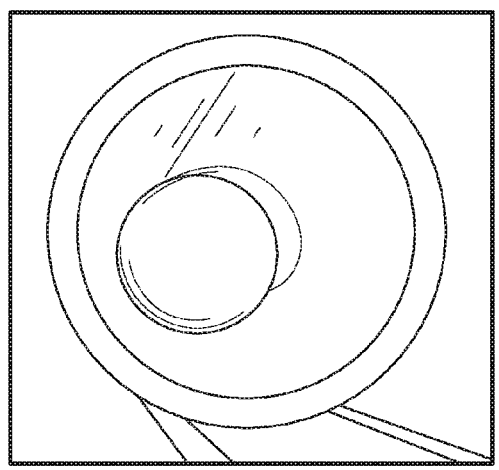
FIG. 1C is a down-barrel image of the plasma source assembly of FIG. 1B.

An embodiment of a compact water treatment plasma source utilizing a novel VHF atmospheric glow discharge is shown in FIGS. 1A-1C. Particularly, FIG. 1A illustrates a schematic of a plasma source configuration, generally designated 100, in accordance with embodiments of the present disclosure. FIG. 1B is an image of a plasma source assembly in accordance with FIG. 1A. FIG. 1C is a down-barrel image of the plasma source assembly of FIG. 1B. The plasma source 100 can be useful in water treatment such as purification, and introduces no additional chemical sources outside those supported by ambient air are exposed to the water under treatment. The plasma source 100 can generate a non-thermal plasma discharge using ambient air and uses, in at least one embodiment, approximately 500 watts of electrical power. Multiple sources can also run in parallel using a common power supply providing approximately 500 watts of electrical power to each individual parallel applicator. The plasma source 100 and supporting power supply can be constructed to be portable, and need not require prohibitive facilities for operations in remote areas. The non-thermal plasma discharge efficiently produces highly reactive radicals and species that have demonstrated impact on water chemistry including inactivation of microorganisms with high efficacy and accelerated removal of persistent organic pollutants such as perfluorinated compounds (PFCs) from water samples. The low barrier for both unit cost, zero-consumable operation (this treatment need not require chemical additives), and operation coupled with the compact form factor of this system present a compelling solution for water treatment not only in established treatment facilities, but also in remote locations and temporary treatment facilities. Water treatment represents one utilization for this plasma source, while additional applications including airborne biohazard mitigation, material processing, assisted combustion, and device sterilization.

The plasma source described herein is a unique plasma system that utilizes the electrical response of atmospheric plasma in the very high frequency (VHF) range of frequencies to sustain a non-equilibrium glow capable of transformative levels of free electron and gas-state radical formation under atmospheric conditions. Current state of the art atmospheric plasma systems either utilize configurations where charged and dissociated species concentrations are relatively low (typically 10,000 times lower than the source detailed in this disclosure), are relatively small (and by necessity not capable of scale up for volume processing) or in thermal equilibrium (thereby eliminating the unique gas phase chemistry achievable in a nonequilibrium plasma discharge).

Advantages of embodiments detailed here are accomplished via VHF ballasting through a plasma discharge that provides negative feedback to thermal instability formation, thereby supporting non-thermal conditions at hitherto unobtainable levels. Utilization of embodiments described herein include the ability to efficiently treat aqueous media, particularly water. Plasma activated water, in at least one example, is water treated with an atmospheric air plasma to produce nitric acid. Nitric acid is formed by exposing distilled water to an active plasma region of the VHF source to reduce the pH of a water sample from 7 to 2.3 via nitric acid at formation at rates 150 times greater than conventional methods.

Anti-microbial properties of an activated solution can include the ability to kill harmful bacteria with high efficacy. In addition to water disinfection, atmospheric plasmas can mitigate perfluorocarbon compound (PFC) and other organic pollutants present in water. A particular advantage of embodiments described herein is that relatively large volumes and power densities enable large volume processing of water sources compared to other technologies. Furthermore, a plurality of gases enable relatively low cost operation. For example, whereas a conventional plasma source may require oxygen/helium gas, at least one embodiment described herein can provide comparable reactive species at much higher fluencies using less expensive non-flammable ambient gas options such as carbon dioxide, which is an ambient gas in which previous systems were not entirely reliable.

Embodiments described herein can be used to modify water chemistry and to efficiently remove persistent organic pollutants from water sources. The VHF plasma source can also be used for direct surface decontamination, material treatment (including removal, deposition, or surface activation/modification), assisted combustion, and air decontamination (particularly by the destruction of airborne microbes with high efficacy). Further uses include plasma activated water production, PFC destruction in water, media free paint removal, and scale up VHF ballasting technology.

In at least one example represented in FIGS. 1A-1C, an atmospheric VHF source 102 is powered by a 3.5 kW, 162 MHz generator 104. The generator 104 has a characteristic termination impedance of 50 ohms and is connected to the source by a 50 ohm high power coaxial cable. A directional coupler, capable of measuring magnitude and phase between the forward and reflected radio frequency (RF) waveforms, may be located at the output of the generator. Source matching can be accomplished via tuned stub matching, where an RF input to the source is fed into the inner conductor of a coaxial feed with an inner conductor diameter of 2.25 cm and an outer conductor diameter of 5.25 cm; the dielectric insulator between the inner and outer coaxial elements is air, giving the coaxial structure a characteristic impedance of 51.7 ohms. The source coaxial feed splits from the RF input to a grounded termination as shown in FIG. 1A and an open termination. The length of the grounded termination and open termination may be determined by the power and air flow that are used to sustain the atmospheric glow. The grounded termination effectively serves as a shunt element for a coaxial matching network, while the open circuit acts as a series element. The atmospheric discharge is initiated at the end of this series element, and acts as the load impedance for this coaxial matching network. Process gas (in this case ambient room air) can be fed into the coaxial structure from the grounded end and flows between the inner and outer conductor inside of the coaxial source, effectively serving as the dielectric insulator of the shielded coaxial structure. In an example, gas flow can be set between 2 L/s and 10 L/s using a needle valve at the inlet of the coaxial source. Air is fed into the assembly slightly off axis in order to promote a cyclonic flow pattern inside the coaxial structure. The end of the inner conductor of the series leg is flared to a diameter of 3.5 cm for the last 3.8 cm of the series leg. FIG. 1B shows a final source assembly housed in an enclosed fume hood. FIG. 1C shows a down-barrel image of the source assembly operating at 500 W with ambient air flow of 5 L/s.

For example, plasma ignition can be initiated with a low flow (~1 L/s) helium gas injection. Upon ignition, the gas is transitioned to a helium/room air mix, immediately followed by a transition to ambient room air only. The ignition and transition steps are initiated at 300-400 W nominal delivered power depending on the desired power level that creates a match with the generator impedance. When a steady state ambient air discharge is established, the power is increased to the desired set point. With proper tuning of the shunt and series lengths, reflected power levels as low as 5% have been achieved.

After ignition and stabilization of the ambient air discharge, a diffuse glow is observed in front of the flared end of the electrode. No plasma is observed in the region behind the electrode surface. After prolonged runs in excess of 20 minutes at power levels of 500 W and air flow of 5 L/s, the outer shield of the structure is cool to the touch. In at least one demonstration, the flared end of the electrode heats up, and approaches temperatures of around 75 degrees Celsius, measured with an infrared temperature monitor, for example a Ryobi Tek4, after the plasma is turned off. During normal operation, pitting or discoloration are not observably produced on any surface in direct contact with the plasma.

Characterization of the glow is carried out via electrical and optical measurement of the system. Optical emission of the plasma region is measured across the visible spectrum with a suitable spectrometer with integrated linear CCD array, providing an instrument resolution of approximately 2 nm. Source impedance measurements may be made using the onboard directional coupler meters on the generator; this provides both magnitude and phase information, enabling source impedance measurement during operation. Discharge current is measured using a small B-loop probe housed in a thin ceramic tube along the inside of the diameter of the outer cylindrical housing. The probe is connected to a suitable oscilloscope for waveform analysis. Source characterization (without plasma) may be done via one-port measurement of the source assembly taken at the end of the RF cable normally connected to the RF generator using a suitable network analyser.

The electrical structure of the coaxial drive can provide a unique opportunity to study trends in system impedance in order to estimate plasma conditions and trends with respect to power and flow. By measuring the vacuum impedance of the coaxial structure, and solving for the necessary plasma load termination impedance of the series leg to achieve the measured magnitude and phase of the reflected power from the source (relative to the forward power from the generator), an estimate of the plasma impedance can be made. These electrical parameters are measured as a function of process setpoint and used with a suitable global plasma model to estimate the electron number density in the discharge.

The impedance of the system was measured by the reflected power and load phase measured at the generator output. Using this impedance measurement along with lossy transmission line theory, the impedance of the plasma can be calculated. A equation used to calculate the impedance along a transmission line follows:

$$Z = Z_0 \frac{Z_L + Z_0 \tanh(\gamma l)}{Z_0 + Z_L \tanh(\gamma l)} \quad (1)$$

where $Z$ is the measured impedance, $Z_0$ is the characteristic impedance of the transmission line, $Z_L$ is the load impedance the line is terminated to, $\gamma$ is the propagation constant of the line and $l$ is the length of the line. Due to the cylindrical electrode at the end of the inner conductor, the load impedance is actually the combination of the plasma impedance in parallel with the capacitance of the gap between the electrode and the outer wall. For this calculation, both the transmission lie properties of the power cable and the coaxial structure of the device were used. An equivalent circuit model for the plasma may then be used to estimate the electron density from the calculated plasma impedance.

Figure 6:
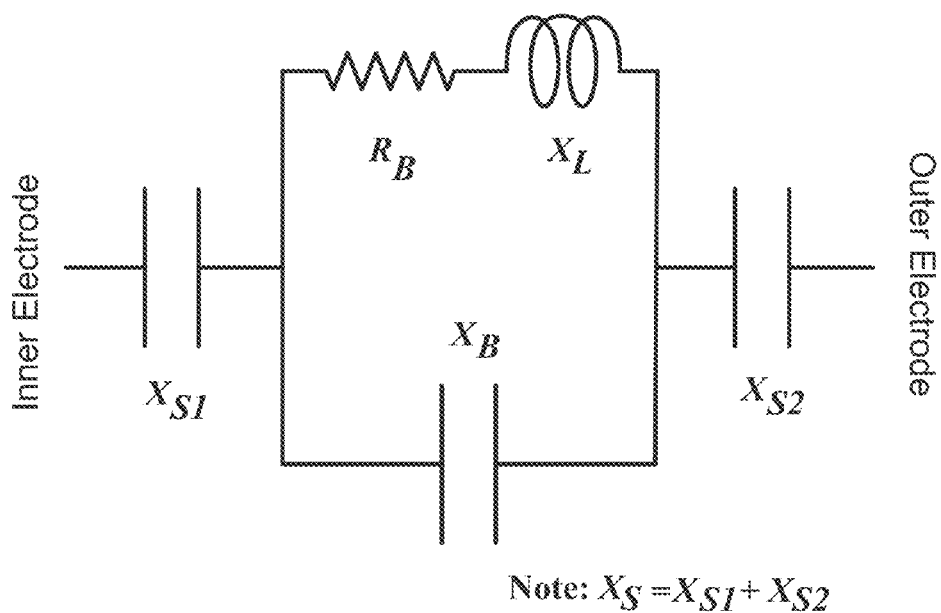
FIG. 6 is an equivalent circuit that may be used to obtain plasma density $n_e$ and sheath reactance $X_S$.

The plasma model uses a suitable equivalent circuit to represent the electrical characteristics of the plasma, including of a bulk plasma impedance in series with the capacitive reactance of the surrounding sheath. The plasma impedance may include the vacuum capacitance of the plasma region in series with a resistive and inductive term that depend on electron density and electron-neutral collision frequency. This equivalent circuit representation may be utilized to study the electrical response of RF discharges, and may be applied to discharge under atmospheric pressure conditions. A circuit schematic is depicted in FIG. 6, which illustrates an equivalent circuit that may be used to obtain plasma density $n_e$ and sheath reactance $X_S$. The real portion of the plasma impedance may be given by the following equation:

$$R_p = \frac{R_B X_B^2}{R_B^2 + (X_B + X_L)^2} \quad (2)$$

where $R_B$ is the dc resistance of the plasma, $X_B$ is the vacuum reactance of the plasma region, and $X_L$ is the plasma reactance. The dc resistance of the plasma RB is given by:

$$R_B = \frac{L\nu n_e}{A e^2 m_e} \quad (3)$$

where L=5 cm is the axial length of the plasma (estimated based on visual observation), $m_e$ is the electron mass, A=9.6 cm² is the area of the powered electrode surface, $n_e$ is the electron density, e is electron charge and $\nu$ is the electron-neutral collision frequency, estimated using the polarization cross section for charged species collisions with neutral species, $$\nu = n_g \sqrt{\frac{\pi \alpha e^2}{m_e \varepsilon_0}} \quad (4)$$

where $n_g$ is the neutral gas density (estimated at room temperature ambient air at atmospheric pressure), and $\alpha=0.021$ nm² is the polarizability constant for air. Although some gas heating is expected, the earlier observation of minimal surface heating after extended operation suggests that this is relatively minimal, and can be ignored. Using equation (4), collision frequencies on the same order of magnitude (approximately $10^{11}$-$10^{12}$ s$^{-1}$) used by other groups to model atmospheric discharge are obtained. Although polarization scattering does present a collision frequency that does not vary with electron temperature, it is shown herein that the emission spectra of the plasma suggests the electron temperature is very constant over the range of conditions studied, and that any electron temperature dependence in collision frequency not accounted for by equation (4) is therefore negligible.

The reactive portion of the plasma impedance is made up of the capacitive sheath terms in series with the reactive component of the bulk plasma impedance. The vacuum reactance of the plasma $X_B$ is the difference between the no-load termination of the coaxial structure $X_0$ and the sheath reactance $X_S$. The sheath is modelled as two series vacuum capacitors defined by their effective surface area and sheath thickness (ODnL and s, respectively, where OD is the outer diameter of the coaxial structure). The no-load termination $X_0$ is measured in the absence of a plasma via one-port measurement of the source impedance using a network analyser at the end of the cable that is normally connected to the RF generator; the termination impedance measured at this point is then transformed to the open end of the coaxial assembly using equation (1) and solving for $Z_L$. The bulk plasma reactance is modelled as an inductor, $$X_L = \frac{\omega R_B}{\nu} \quad (5)$$

and the imaginary term for the total discharge impedance is given by:

$$X_p = X_s + \frac{X_B R_B^2 + X_L X_B (X_L + X_B)}{R_B^2 + (X_L + X_B)^2}. \quad (6)$$

In reviewing equations (2)-(6), the two plasma parameters that determine the termination impedance $R_p+iX_p$ are $n_e$ and s. Measurement of the plasma loaded impedance of the coaxial structure at the generator output, transformed to the plasma termination via equation (1), provides $R_p$ and $X_p$. Using equations (2)-(6) for $R_p$ and $X_p$ provide a system of equations from which the two unknowns for the system, $n_e$ and s, can be extracted. Similar high-frequency models have reported good correlation to plasma conditions for VHF atmospheric plasmas under different conditions (gas, geometry, power, density, etc.).

Figure 7:
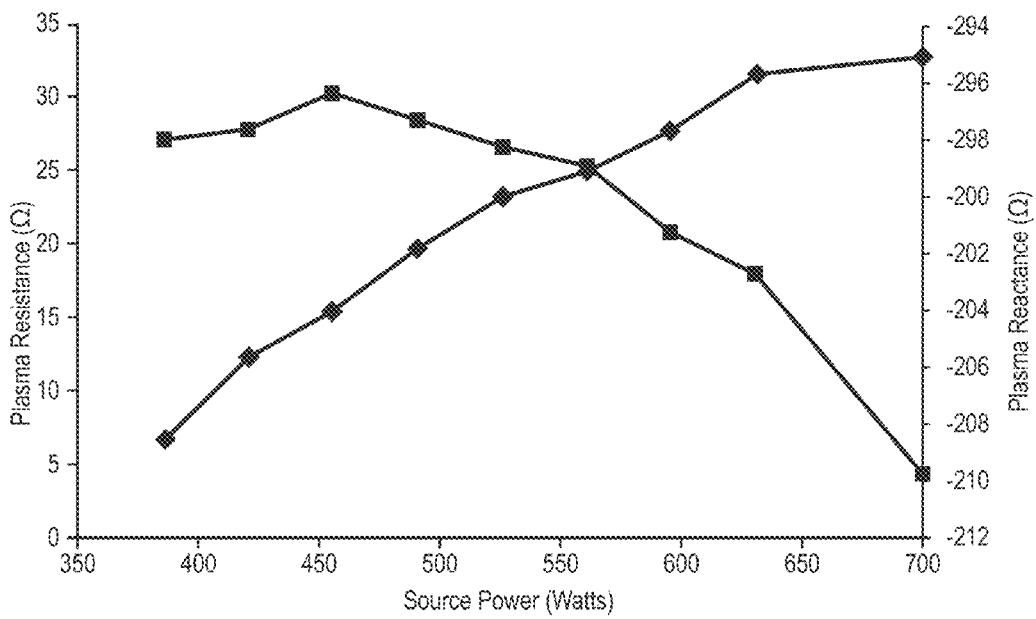
FIG. 7 is a graph showing resistance $R_p$ and reactance $X_p$ measured as a function of delivered power for ambient air flow of 5 Ls$^{-1}$.
Figure 8:
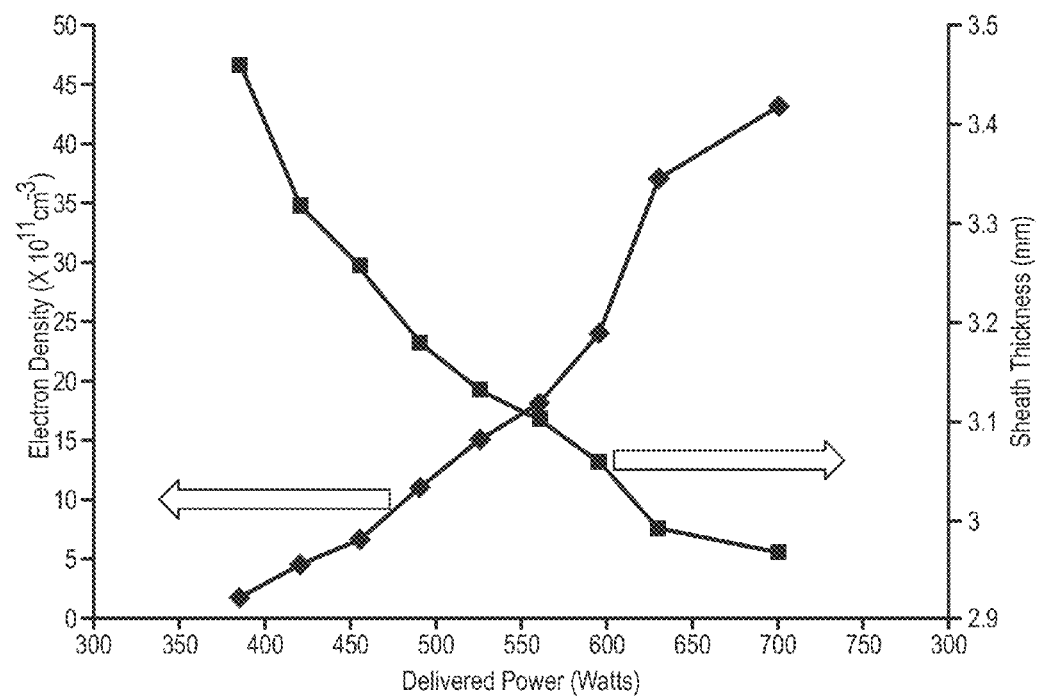
FIG. 8 is a graph showing electron density and sheath thickness estimations made from electrical measurement of source impedance as a function of delivered power to the source.
Figure 9:
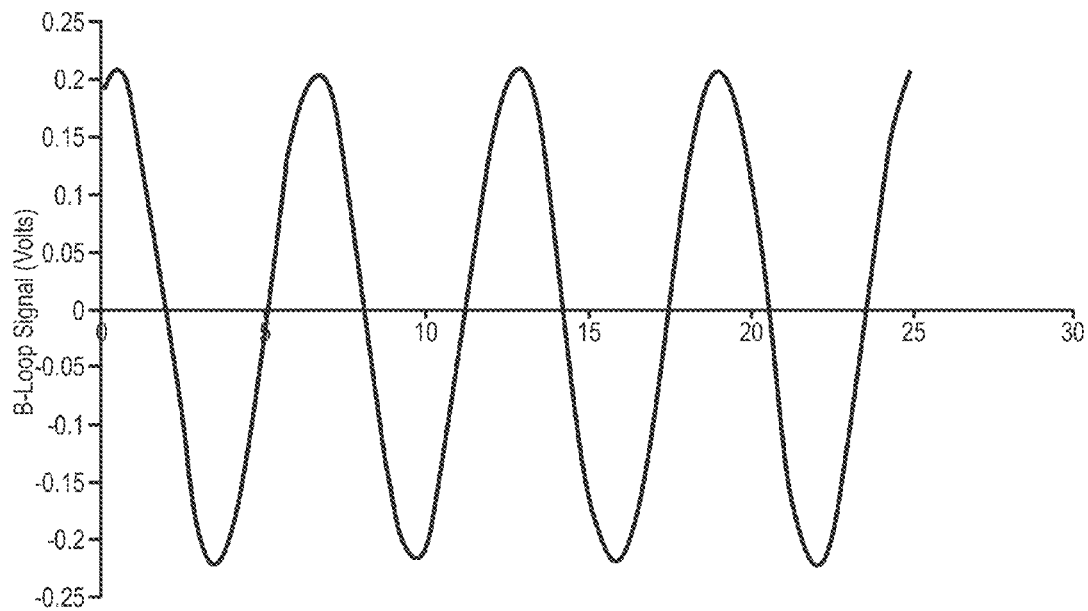
FIG. 9 is a graph of a representative B-loop measurement of current waveforms produced in the coaxial plasma source, where 1 V is approximately equal to 0.1 A induced current on the loop diagnostic.

Measurements of the source impedance loaded by a plasma discharge were made at fixed coaxial lengths as a function of dissipated RF power. The source was ignited at 300 W using an initial helium flow that was transitioned to ambient air flow of 5 Ls$^{-1}$. Power was swept from 300 W to 600 W for constant flow; reflected power magnitude and phase was recorded at each power setting. The plasma impedance was calculated using equation (1), accounting for the additional shunt impedances imposed by the grounded coaxial termination and flared electrode end on the plasma (series) leg. A summary of the plasma impedance with increasing power is shown in FIG. 7, which illustrates a graph showing resistance $R_p$(♦) and reactance $X_p$(■) measured as a function of delivered power for ambient air flow of 5 Ls$^{-1}$. Using equations (2)-(6), the electron density and sheath thickness can be estimated. A summary of the calculated electron density and sheath thickness is shown in FIG. 8, which illustrates a graph showing electron density (♦) and sheath thickness (■) estimations made from electrical measurement of source impedance as a function of delivered power to the source. To determine the presence of thermally driven instabilities such as ionization thermal instability, a B-loop current probe was shielded from the plasma via a thin ceramic tube and inserted down the coaxial device along the outer wall and inserted down the coaxial device along the outer wall so-as to minimize plasma perturbation. The current probe was a shielded rigid coaxial structure. The inner conductor of the rigid coax was looped and soldered to the grounded outer shield, forming a loop structure approximately 6 mm in diameter. The probe was connected to a suitable oscilloscope where the induced potential generated by the time varying current in the plasma discharge interacting with the B-loop diagnostic was measured. Measurements with the B-loop diagnostic was measured. Measurements of current were taken along the length of the device and were greatest in magnitude when the current probe was in line with the plasma body (i the cross section area of the probe was facing the centre axis of the coaxial discharge). The measured current decreased to near zero when the Bloop normal vector was aligned perpendicularly to the normal vector from the barrel capacitor and peaked when the B-loop normal vector was parallel with the capacitor normal vector. The probe was calibrated using Faraday's law to determine the induced potential generated by a time varying magnetic field of magnitude B passing through the loop of the probe, $\in$=NBAω, where $\in$ is the induced potential, N is the number of turns (N=1 for this probe configuration), A is the cross sectional area of the probe (12 mm$^2$) and ω is the natural frequency of oscillation (2π×162 MHz). The induced magnetic field was correlated to plasma current using Ampere's Law, B=μ0I/2πr, where μ0 is the permeability of free space, I is the RF current amplitude and r is the distance from the loop probe to the centre of the plasma (1.5 cm). The calculated relationship between current at 1.5 cm and induced potential agreed well with measurements made using a 50 ohm terminated Bird Truline model 1908 coaxial directional coupler housing, where one of the directional couplers was replaced with the B-loop probe to measure current near the 50 ohm termination. Although this calibration is an approximation based on the rough dimensions of the plasma, it does highlight the resolution of the probe compared to current signatures attributed to thermal instabilities by other groups, where mA ranges can be expected. The plasma current trace is a near perfect 162 MHz sinusoid for all powers and flows studied, and shows no evidence of streamers or arcing such as spikes or irregularities (dips, humps, etc.) that have been identified in previously. A representative waveform trace is illustrated in FIG. 9, which illustrates a graph of a representative B-loop measurement of current waveforms produced in the coaxial plasma source, where 1 V is approximately equal to 0.1 A induced current on the loop diagnostic. The absence of thermally driven instabilities and arcs may be due to the plasma impedance response to increasing electron density.

Figure 10:
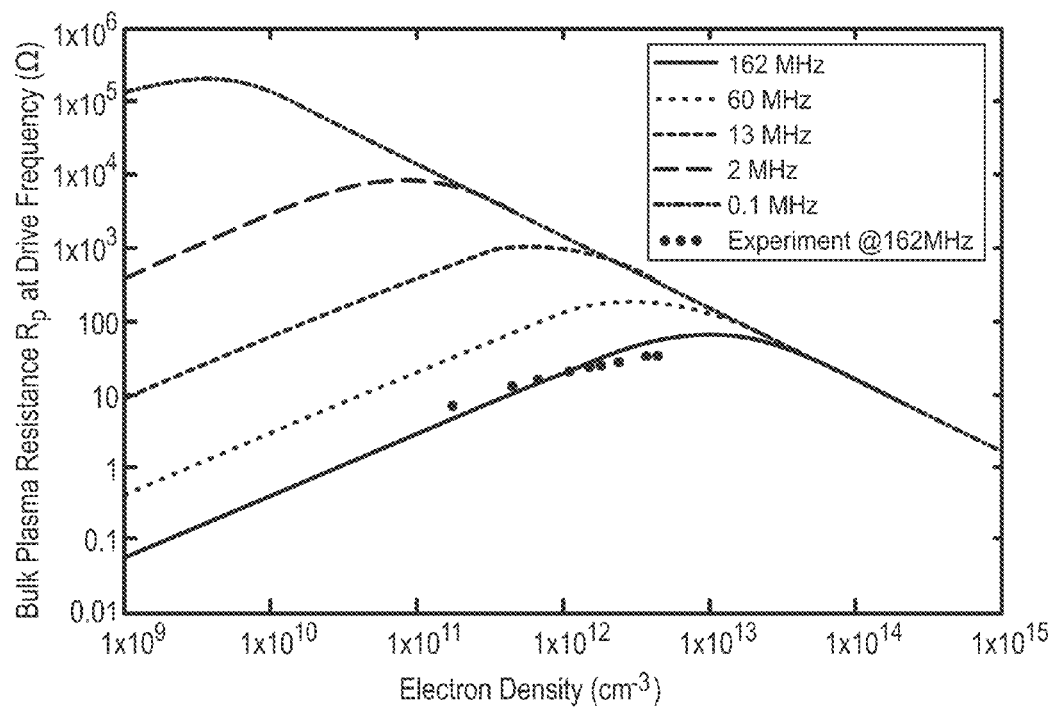
FIG. 10 is a graph showing response of bulk plasma resistance $R_P$ at the RF drive frequency as a function of electron density for various frequencies, including the measured real impedance and calculated electron densities for the conditions studied at 162 MHz drive.

In the present subject matter, the progression from increasing electron density heating the background gas (and thereby reducing the gas particle density), which increases the E/n ratio for a dc discharge, increasing electron temperature and thereby increasing ionization rate and thus electron density (further feeding this chain from the beginning) was shown to be a mechanism with positive feedback that drove this instability in atmospheric systems. At very high frequencies such as 162 MHz, a similar analogy can be made, but in this case, negative feedback is observed. The analogy may be as follows: assume that through some perturbation, an incremental increase in electron density δne is generated in the coaxial discharge. Similar to the ionization thermal instability, this results in an increase in the real portion of the plasma discharge impedance $R_p$. This increase in $R_p$ decreases the RF current driving the plasma discharge assuming that the delivered power is constant since P=I$^2$Rp. where P is the delivered power to the system and I is the RMS current amplitude through the discharge. On first order, the electron density tracks with RF current and sheath thickness with the equality $s_0$eω$n_e$A=I, where so is the sheath thickness of the capacitive discharge. Reviewing the plasma parameters summarized in FIG. 8, $s_0$ is a relatively slowly varying parameter compared with electron density as a function of P (and hence I$^2$), and is therefore not a significant contributor to the change in I. Therefore, the introduction of δ$n_e$ reduces I, and introduces negative feedback to the time dependence of δ$n_e$, effectively restoring the electron density established by the global particle and energy balance of the discharge. Taking a nominal discharge impedance of (24.9−j198) ohm that was measured at 560 W, 5 L s-1 gives an RC time constant of 0.1 ns, much shorter than the measured characteristic frequency of thermally driven instabilities such as ionization overheating, which are tens of nanoseconds. This negative feedback, coupled with the much faster time response of the system, is believed to be the mechanism that supports a volume glow in this source; effectively, the plasma load acts as a ballast at these high drive frequency conditions for atmospheric discharges. Varying frequency in equations (2)-(6) show that as frequency is decreased, the electrical response of the system reverts back to a regime where increasing electron density reduces bulk plasma resistance, thereby introducing a positive electrical feedback that cannot counteract instabilities induced by changes in δ$n_e$. This frequency dependence is illustrated in FIG. 10. Additionally, the reduction in gas density that follows the introduction of δ$n_e$ has minimal impact on the RF impedance of the discharge, even for reductions as high as 10×.

Figure 11:
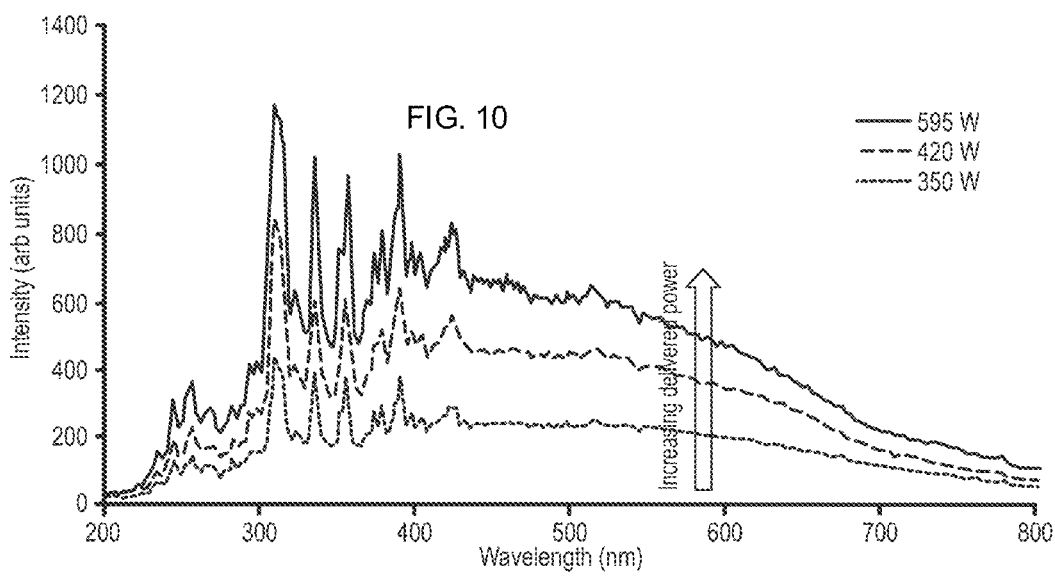
FIG. 11 is a graph showing integrated spectra as a function of delivered power from 350 to 595 W.
Figure 12:
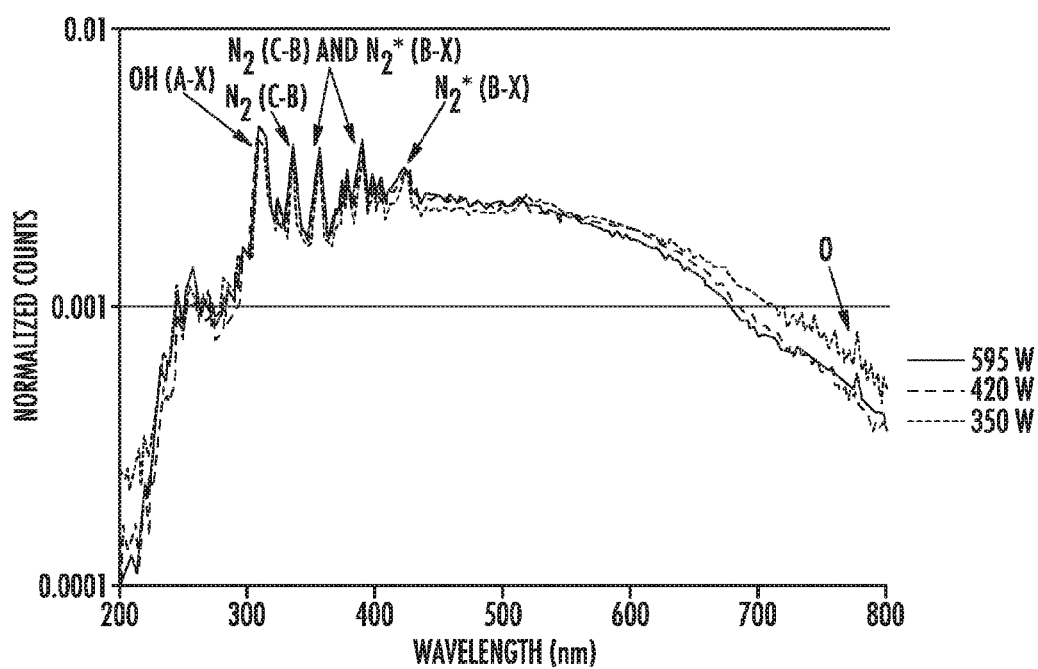
FIG. 12 is an overlay of the integrated emission spectra as a function of delivered power.

Visible spectra were acquired using a spectrometer with approximately 2 nm line resolution over the visible spectral range 200-800 nm. Integrated spectra were obtained via light collection at the open end of the coaxial barrel (no spatial resolution). Spectra were obtained for ambient air discharges as a function of applied 162 MHz power from 300 to 600 W for ambient air flow of 5 Ls$^{-1}$ and as a function of flow from 2 to 10 L s$^{-1}$ for constant delivered power of 500 W. The spectrometer was not calibrated with a blackbody light source. Although this inhibits quantitative comparison of emission peaks for a given condition, relative intensities as a function of plasma condition still lend some insight into plasma composition. Spectra obtained as a function of air flow from 2 to 10 L s$^{-1}$ did not yield and significant trends in either integrated spectra or axially resolved spectra, indicating minimal plasma emission dependence with respect to the flow range studied. As a function of power, the spectra monotonically increased in intensity, as shown in FIG. 11, which illustrates a graph showing integrated spectra as a function of delivered power from 350 to 595 W. When the spectra is normalized for each power condition such that the area under the spectra for each case is equal, it is observed that the overall shape of the spectra does not change as a function of power, and that the relative composition and temperature of the plasma appears to remain relatively constant over the studied power range. This monotonic spectroscopic response indicates little or no change in electron temperature over the range of conditions studied, further validating the earlier assumption that the electron collision frequency is constant over this range of conditions. FIG. 12 is an overlay of the integrated emission spectra as a function of delivered power; the emission peaks of dissociated species of interest for air plasma applications including NO, OH and O are highlighted.

RF impedance analysis of the plasma termination of the coaxial structure combined with correlations between electrical impedance and plasma characteristics indicate a nominal free electron density of $10^{12}$ cm$^{-3}$. This density is substantially higher than previous large area atmospheric systems that typically report electron densities on the order of $10^8$ cm$^{-3}$. The practicality of this result: is notable: plasma chemistry is driven by electron impact events, and as such, the formation of reactive species for utilizations such as water treatment, biological remediation, and surface treatments can track one-to-one with this density. To enable competitive production rates, high electron density is required; the technology detailed here improves upon previous technologies in this regard by a factor of 10,000.

An advantageous feature of embodiments described herein, is that even at these high electron densities, non-thermal reactive chemistry is observed. Species that are typically lost to thermal decomposition in state of the art systems (such as hydroxyl) are evident. Thus, the ability to maintain non-thermal air plasma chemistry even at high electron densities is provided Utilizations of embodiments described herein include but are not limited to: water treatment such as PFC remediation, and formation of plasma activated water for high efficacy biological remediation, multiple treatment objectives (disinfection, oxidation/reduction of persistent organic pollutants) without the need of chemical addition, remediation of perfluorinated compounds, industrial wastewater treatment, remediation of contaminated groundwater sites, and drinking water production in remote areas and disaster relief zones. Commercial utilizations include disinfecting water in large volumes such as in swimming pools without the need for chlorination or other chemical treatments. Advantages are derived by embodiments described herein over some other water treatment technologies that require the use of chemicals and that can therefore have substantial adverse health and environmental impacts.

Chlorination, ozonation, and UV irradiation are commonly used for disinfection. Plasma sources described herein are effective producers of UV, and can provide fluence comparable to current technologies while also providing chemical pathways for enhanced remediation. For oxidation, ozonation and advanced oxidation such as UV/$H_2O_2$ can be used to form hydroxyl radicals. For reduction, reactive barriers containing zero-valent iron (ZVI) can be used in groundwater remediation. ZVI barriers may be effective for PFCs and are effective for compounds that are more easily reduced (e.g. perchlorate, chlorinated hydrocarbons). In both cases, plasma sources provide parallel pathways for reactive species production compared to single pathway methods that rely solely on ultraviolet light.

Utilizations of embodiments described herein include, but are not limited to: water treatment applications; plasma source technologies; materials processing; air purification; surface sterilization; gas reforming; combustion; and low power, zero chemical disinfection and biocide treatment of water for commercial and industrial use; global water treatment infrastructures; water treatment for reclamation; water re-use and recycling; and low power water treatment.

Utilizations of embodiments described herein include but are not limited to: low cost gas sources and ambient air may be used in place of ambient air. Specifically, both steam-fed and $CO_2$ fed plasma sources for water treatment with minimal nitrate production are within the scope of these descriptions. Operating conditions provide viability with respect to potable water treatment. Water treatment capabilities of this technology can be rigorously characterized with regard to water modification after plasma exposure. Metrics can be based on current water treatment challenges in the areas of disinfection and biocide treatment.

Specific exemplary utilizations include, but are not limited to: disinfecting *Escherichia coli* (*E. coli*) inactivation rates, oxidative effects for synthetic organic chemicals that are of concern in the production of safe drinking water; oxidative destruction of the herbicide atrazine, which is a suspected endocrine disrupting chemical and is difficult to remove by conventional water treatment technologies; reductive effects by defluorinating PFCs, which are ingredients in stain repellents and fire fighting foams, and are used in the production of non-stick materials and semiconductors. PFCs are persistent organic pollutants for which cost-effective water treatment technologies are needed.

Exemplary utilizations, advantages, or features include, but are not limited to: energy efficiency with regard to the energy demand of plasma treatment water treatment processes such as ozonation and advanced oxidation processes (e.g., UV/$H_2O_2$ treatment); plasmas generated from ambient air, carbon dioxide, and steam for disinfection and oxidation/reduction; and disinfection of *E. coli* bacteria in wastewater.

To facilitate the testing of different gases and provide a form-factor representative of exemplary source design for water treatment utilizations, a dedicated plasma source assembly for water treatment applications is provided at low cost. A VHF generator is used for an exemplary source assembly.

In at least one example, a plasma source utilizes a sliding short/series assembly that enables preliminary source tuning at different power levels and flows. In an example, a rugged fixed length design is implemented.

Material erosion is a documented problem in water and steam plasma sources. Some approaches, however, revolve around a DC plasma source configuration that requires conducting pathways for DC current. These surfaces tend to react with the reactive species in the steam plasma and promote erosion. One advantage of the VHF drive for at least one plasma source assembly within the scope of these descriptions is that a DC return path is not required, and as such, plasma facing surfaces can be coated with chemically impervious materials such as hard anodized aluminum or other thin coatings to minimize erosion loss. Hard anodized surfaces are used in plasma processing systems in other applications where hydrogen and oxygen fed discharges are present.

Figure 2A:
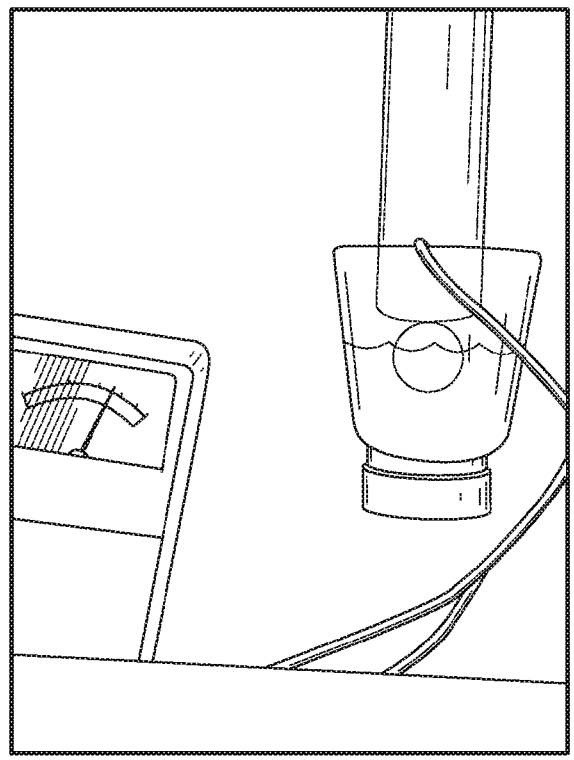
FIG. 2A is an image of an exemplary embodiment treating water with an air plasma.
Figures 2B, 2C:
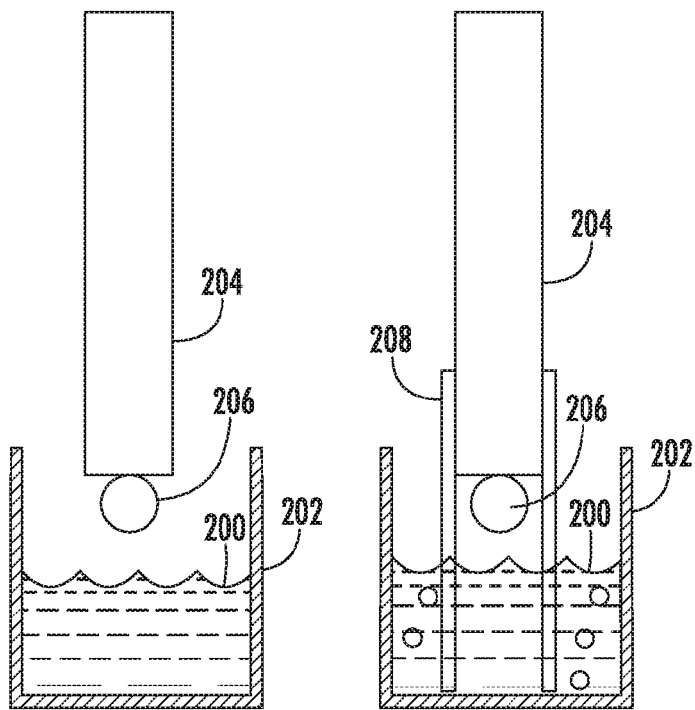
FIG. 2B is a schematic of an exemplary plasma source, highlighting plasma exposure on the surface of a solution under treatment.
FIG. 2C is a schematic of an exemplary plasma source in which plasma is delivered to the volume underlying the surface.

Exemplary utilizations, advantages, or features include, but are not limited to: efficient reactant delivery to an aqueous solution; and plasma placement in close proximity to the surface of water (see FIGS. 2A and 2B) to efficiently deliver reactants to the volume sample and maximize the interaction time between these species and the sample, in which a quartz delivery tube that is inserted (FIG. 2C). To form a plasma discharge using dry steam as the feedgas, the source can be heated to prevent condensation along the source assembly and delivery system. Surface heating can be accomplished using heat tape or other heat source. Steam can be provided by a steam generator.

FIG. 2A illustrates an image of an exemplary embodiment treating a 16 ounce sample of distilled water within a container with a 500 W air plasma. FIG. 2B illustrates a schematic of an exemplary setup, highlighting plasma exposure on the surface. Referring to FIG. 2B, water 200 is held by a container 202, and a plasma emitting nozzle 204 applies plasma 206 to a surface of the water 200. FIG. 2C illustrates a proposed modification where a Pyrex cylinder 208 is used to deliver plasma species to the volume of the sample, increasing interaction time with the sample.

Exemplary utilizations, advantages, or features include, but are not limited to: a steam fed glow discharge; an atmospheric steam fed glow; and utilizing VHF ballasting to sustain a non-equilibrium glow in a dry steam ambient flow. Previous efforts have focused on DC thermal arc discharges. VHF ballasting may be utilized to sustain a non-equilibrium glow in a dry steam ambient. Air, helium, and carbon dioxide discharges may provide beneficial conditions, and steam plasma may provide a viable pathway for water treatment without the need for chemicals for applications where air discharges may not be viable due to their formation of nitrate species. Consequently, an atmospheric steam glow may provide utilization opportunities outside of water treatment, and uses in the areas of disinfection, biocide, and additive removal.

Exemplary utilizations, advantages, or features include, but are not limited to: using an array of feed gases including ambient air, helium, carbon dioxide, and dry steam; manufacturing processes can benefit from an atmospheric glow with ambient air, specifically in the areas of chemical abatement and enhanced combustion. Currently manufactured abatement systems for semiconductor manufacturing systems are limited to low pressure foreline operation where abatement may not be optimally effective.

Figure 3:
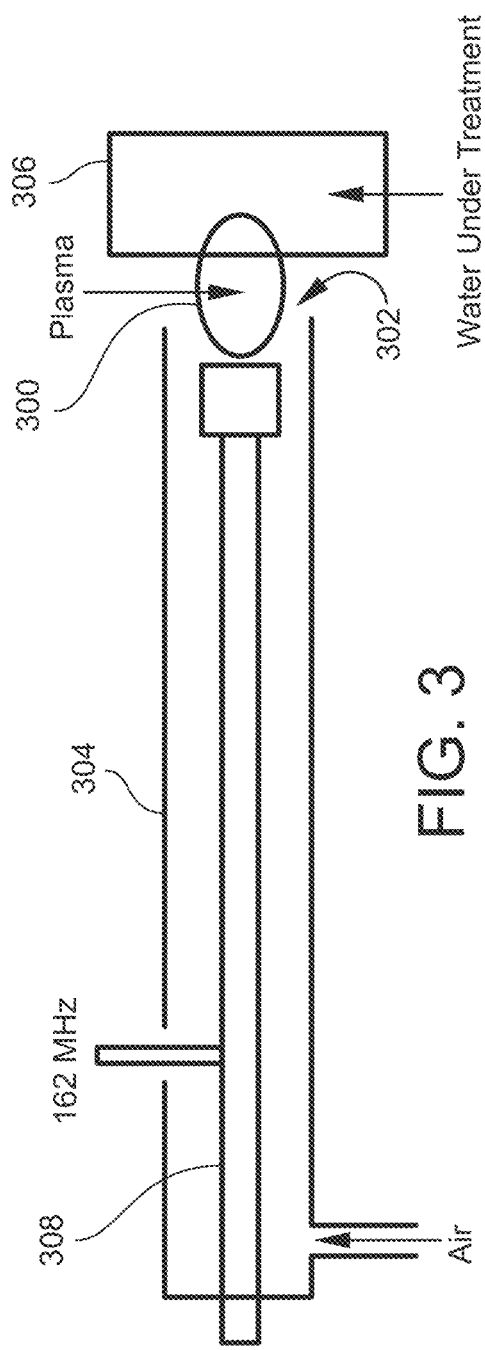
FIG. 3 is a schematic of an example plasma source according to at least one embodiment described herein.
Figure 4:
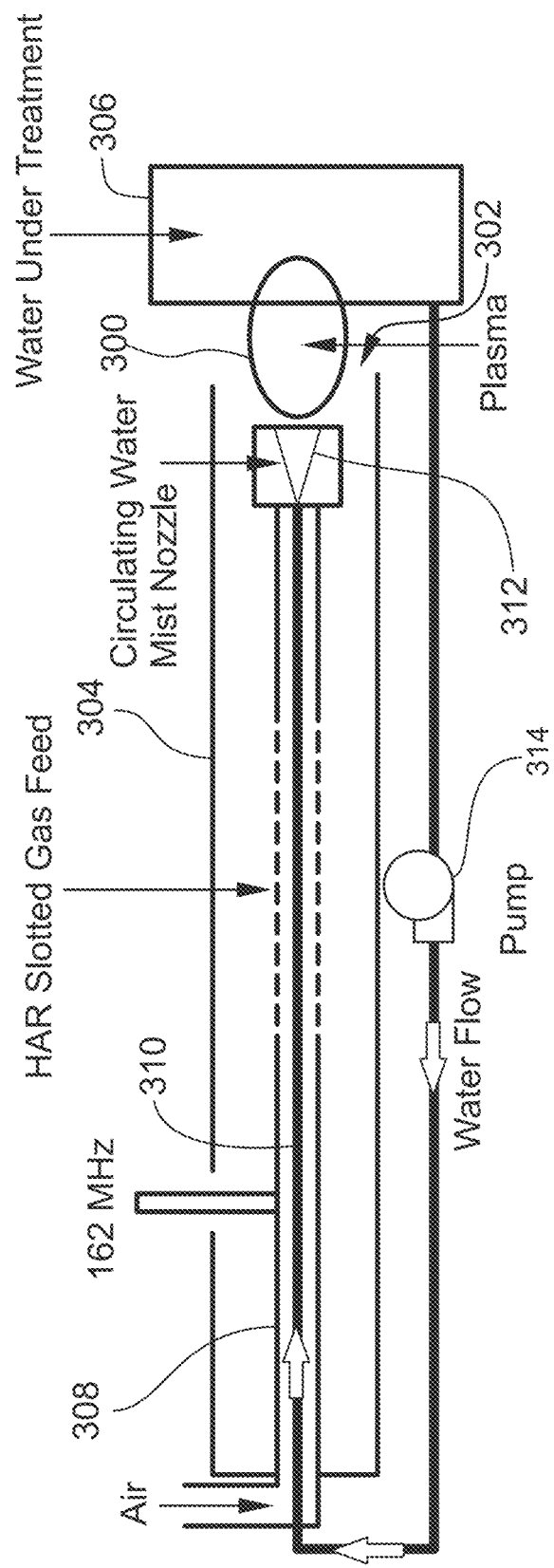
FIG. 4 depicts a plasma source through which water under treatment is cycled according to at least one embodiment described herein.

FIGS. 3 and 4 illustrate schematics of exemplary plasma sources in accordance with embodiments of the present disclosure. Referring to FIGS. 3 and 4, each includes an outer electrically conducting tubular housing and an inner conductor. The inner conductor is connected and grounded to the tubular housing at a rearward closed end of the plasma source, typically away from the plasma region. The inner conductor and tubular housing extend coaxially with the inner conductor having a free terminal end carrying a plasma-facing end structure. The inner conductor and tubular housing are conductors grounded together at the closed end defining a coaxial DC ground structure. A VHF source provides an oscillating voltage signal to the inner conductor at a selected position from the closed end. A plasma is formed forward of the plasma-facing end structure or electrode. In FIGS. 3 and 4, the plasma 300 extends forward through the open forward end (generally designated 302) of the tubular housing 304 and passed into a water sample 306 under treatment. In FIG. 3, a gas intake receives gas, such as air, into the annular cylindrical space between an inner conductor 308 and the tubular housing.

In FIG. 4, the inner conductor 308 is formed as a hollow tube into which gas, such as air, flows from a gas intake at the rearward end. An electrically non-conducting fluid conduit 310, such as poly tubing extends along the inner bore of the hollow tubular inner conductor from the rearward end to the plasma-facing end structure, which has a flared or conical inner bore that opens toward the open end 302 of the tubular housing defining an atomizing water nozzle 312 in the forward surface of the electrode. In another embodiment, the hollow center electrode itself serves as the piping for direct delivery of liquid to the end of the inner coaxial structure. This allows for direct injection of liquid into the active plasma region, increasing the effective surface area for interaction and thereby increasing the amount of air reactant uptake various nitrogen/oxygen ($NO_x$) compounds and the amount of OH production through interaction. This could be beneficial with respect to increasing production throughput. High aspect ratio (HAR) slots are formed through the cylindrical wall of the hollow tubular inner conductor and gas that enters through the intake passes through the slots from the interior bore to the annular cylindrical space between the inner conductor and the tubular housing. By forming gas passages through the wall of the inner conductor as HAR slots, having a width that is smaller than the depth (about a factor of 5 at nominal frequencies of 162 MHz with a slot width of 500 micron), in a region of low field intensity, coaxial flow of gas about the inner conductor is achieved as gas such as air is driven through the system with high conductance, allowing for great flow per unit delta pressure while still screening RF from the inside of the inner conductor, that is, without great passing of the VHF signal across the annular cylindrical space to the outer housing.

The fluid conduit extends from the rearward end of the plasma source to a fluid source. In the illustrated embodiment, a fluid pump 314 drives fluid along the fluid conduit. Fluid is thereby injected or released forward through the flared end of the plasma-facing end structure in a controllable quantity and rate, such as by misting. In the illustrated embodiment, the fluid conduit draws water from the water sample under treatment as a convenient fluid source. The fluid conduit is not fluid permeable and thus the gas flowing through the hollow tubular inner conductor and out through the HAR slots does not mingle with the conduit fluid until each reach the plasma region forward of or near the plasma-facing end structure. In another embodiment, the water that is directly injected through the plasma is drawn from the treated water source itself thereby forming a closed loop treatment system that modifies water chemistry while feeding water through the active plasma region.

Increasing air flow is expected to be beneficial for NOx production. Direct water injection is expected to contribute more to OH production (and may be more impactful for things like water treatment and disinfection, but also plays a key role in fertigation).

In FIGS. 3 and 4, the VHF source is indicated as a 162 MHz source. Other frequencies are within the scope of these descriptions and may be suited to various other oscillators and various intended uses for the generated plasma.

Figure 5:
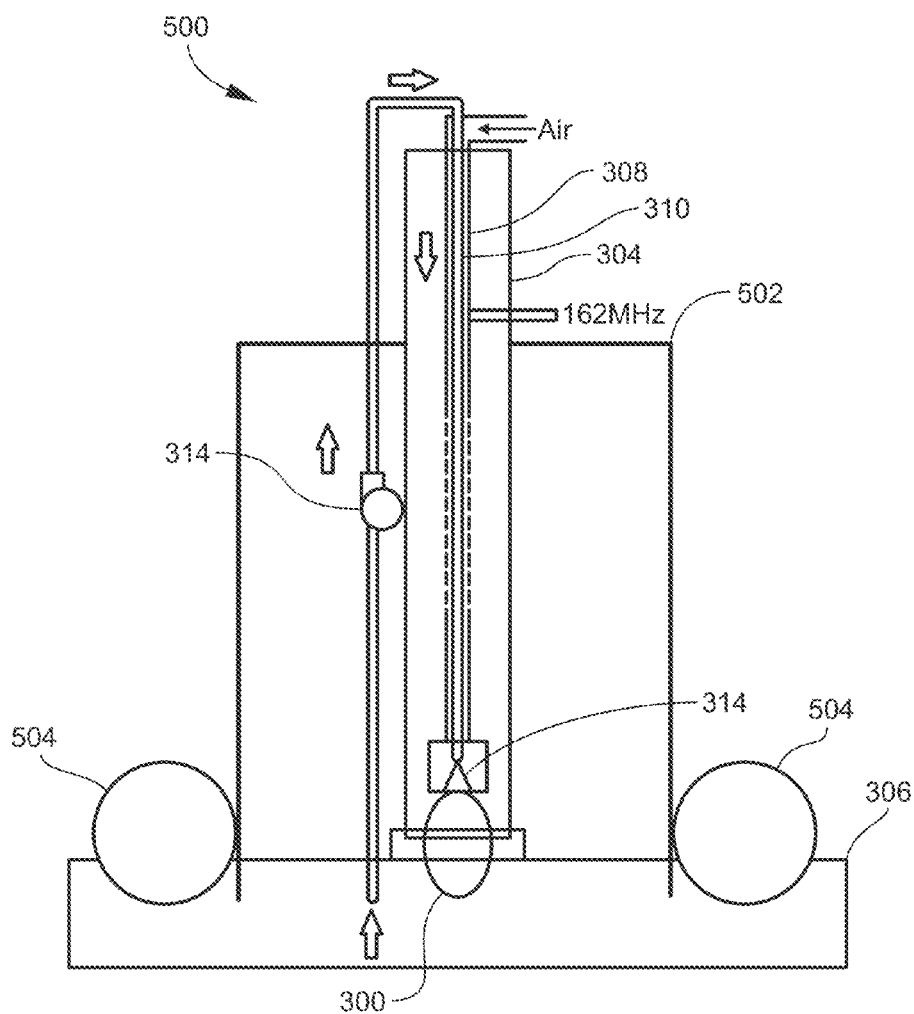
FIG. 5 depicts a floating plasma source for water treatment according to at least one embodiment described herein.

In another embodiment, as shown in FIG. 5, integration of features from other VHF embodiments is provided. A plasma source, generally designated 500, is housed in a contained atmosphere within a container or housing 502. Humidity in the air feeding the plasma source 500 is provided by drawing the air from the volume to increase OH production. An external air or water supply may be used, or a water injection method may be employed with a recirculating or external water source. This may be beneficial for treating large volumes of water. Floatation buoys 504 may be configured with the plasma source 500 and the container 502 for imparting floatation on the surface of the water 306. Also, the floatation buoys 504 may be configured to provide a seal between the open end of the container 502 and a surface of the water 306. It should be understood that any suitable floatation element(s) may be configured to provide buoyancy.

Exemplary utilizations, advantages, or features include, but are not limited to: VHF ballasting, which entails running the plasma in a mode where reactive electrical components provide an increasing resistance with perturbations that transition the system to an arc; interaction between the source design and the matching response to perturbations to drive the system to a non-equilibrium glow and ride out perturbation because without matching the arc may blow because the circuit is isn't given the necessary bandwidth to ride out transients.

Air flow is provided in an operational range. Below that range, flow is too low and stagnant heating of the gas will eventually result in an arc. If the air flow is too high, the discharge can blow out without also compensating for power.

The system can run with dielectric coatings on the surfaces since it need not rely on a DC ground return path. This provides pathways for chemical resistance and higher plasma densities.

A plasma source as described herein is not limited to 162 MHz. As long as the ballasting regime is reached a low enough frequency for ohmic heating and not wave heating.

Direct plasma interaction with the water provides the fertigation process. Efforts to remotely produce nitrate species and bubble it into water may not work. This is a marked difference between this source and other arc methods, and points to the interaction (and possibly the OH production) playing a role.

In at least one example of fertigation, the impact of plasma water on plant growth is notable. Herbicidal uses may be provided. Adverse impact on plant growth can be detected in the germination phase.

In accordance with embodiments of a plasma source described herein, point of use fertigation is applied to irrigation water utilizing plasma to produce nitrogen bearing species. Nitrogen uptake at 60 ppm in water via direct exposure to an air plasma has been demonstrated. These levels approach those found in conventional fertilizer applications (~200 ppm) and present a transformational technology where fertilizer production can be accomplished at the point of use (on the farm) as opposed to offsite and distributed, such as by current ammonium nitrate/fertilizer distribution systems.

A novel method of fertilizer production is provided by which soluble nitrogen bearing species are generated using an atmospheric air plasma treatment of irrigation water for agricultural purposes. This provides comparable nitrogen concentrations to that found in typical fertilizers, requires relatively low power to operate, and does not have any consumables in the production of the fertilizer. This provides an alternative pathway for fertilization of crops with respect to conventional off-site fertilizer production and delivery infrastructures currently used, and presents a compelling pathway for fertilization of crops where conventional fertilizer production and distribution infrastructures are not currently available.

In at least one embodiment of a plasma source described herein, a point of use plasma source is used to incorporate water soluble nitrogen species into an irrigation water supply using electricity, air, and irrigation water. A pH buffer additive such as baking soda to increase nitrogen uptake without decreasing pH to counterproductive levels may be provided.

Advantages include: zero consumables, particularly with regard to the substantial use of petrochemicals in traditional fertilizer production; zero dependence on distribution networks, enabling point of use production in remote or underdeveloped regions of the world; no need for products such as ammonium nitrate, which is an explosion risk and a possible security concern; accelerated seed germination; and reduced dependence on distribution infrastructure and petrochemicals for the production of fertilizer otherwise necessary for maintaining crop yields and food supplies.

In embodiments described herein, point of use fertigation of irrigation water utilizing plasma production of nitrogen-bearing species is provided by a method of in-situ fertilizer production where soluble nitrogen-bearing species such as nitrates and nitrites are generated using an atmospheric air plasma (i.e. ionized gas) treatment of an irrigation water supply. In one embodiment, the plasma is generated by a tube which is approximately two feet in length and three to four inches in diameter. The tube has an air intake and is connected to a high frequency (3.5 kW 162 MHz) generator. In use, the end of the tube is placed above the surface of the irrigation water supply and the plasma emanating from the tube generates nitrogen species in the water.

At least some embodiments according to descriptions herein are capable of providing nitrogen concentrations (60 ppm vs. 200 ppm) comparable to that found in conventional nitrogen fertilizers, require relatively low power to operate, and do not require any consumables. In contrast to the current model where nitrogen fertilizers are manufactured in central locations and are subsequently delivered to each farm, the current technology is used to provide nitrogen fertilizer on the farm itself as and when needed.

At embodiments according to descriptions herein can be used to produce nitrate species for crop fertilization or accelerated seed propagation. Some embodiments can be used to control the ratio of nitrates ($NO_3$) to nitrites ($NO_2$) in water. Nitrite is a toxic form of nitrogen in plants, and so a high level of nitrites in the water could be used to kill unwanted plants. This has been demonstrated on radishes, tomatoes and marigolds. The result was a 50% improvement in the number of leaves compared to no fertilizer use.

Advantages of some embodiments over conventionally-produced inorganic nitrogen fertilizers include but are not limited to: no or little consumables are required, including zero petrochemicals or natural gas; zero dependence on distribution networks, enabling point of use production in remote or underdeveloped regions of the world; and products such as ammonium nitrate or ammonia are not produced. Ammonium nitrate is an explosion risk and a possible security concern. Ammonia, as a gas or in aqueous solution is an irritant and is corrosive to the skin, eyes, respiratory tract and mucous membranes. Ammonia may cause severe burns, and eye or lung injuries. Skin and respiratory related diseases are aggravated by exposure. The ratio of nitrates to nitrites can be controlled, so the technology can be used as a fertilizer and an herbicide, a herbicide that is non-toxic, i.e. organic. Some embodiments can be run using solar power, for example using about 10 to 15 amps of alternating current. Some embodiments may be used to destroy weeds that have become resistant to existing herbicides.

A coaxially driven VHF plasma source for atmospheric air plasmas has been built and characterized. The atmospheric plasma discharge does not appear to produce streamers or arcs to the grounded surface, but instead remains as a steady state glow located at the end of the inner coaxial power feed. Plasma impedance was measured and combined with a global model to estimate an electron density of $10^{11}$ cm-3 at 400 W delivered power in air. Optical emission characterization shows a monotonic increase in emission with respect with power; the relative intensity of the peaks from excited species remains constant for powers from 300 W to 600 W. Utilizations include uses in remediation and thin films.

A large area, high power density atmospheric air plasma is provided having size and power density advantages of this source over other sources and having the capability produce radical gas phase species for air treatment or surface treatments at rates not achievable with conventional systems.

Exemplary utilizations, advantages, or features include, but are not limited to: sterilization; biological remediation; air treatment; surface treatment; material deposition and removal; water treatment; remediation; and thin films. An atmospheric plasma according to one or more embodiments described herein is useful in a plurality of areas and advantageously overcomes low power density and low processing rate limitations. An atmospheric plasma according to one or more embodiments described herein provides power densities substantially higher than previous systems while avoiding the formation of thermal arcs that inhibit the formation of the non-equilibrium chemistries that provide the benefit of plasma assistance in these applications.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An atmospheric air plasma source comprising:
   an electrically conductive outer cylindrical tube having an air intake and an electrically conductive inner conduit coaxially with the outer cylindrical tube and in fluid communication with the air intake;
   an electrical voltage generator electrically connected to the inner conduit and configured to oscillate at very high frequency (VHF) frequency such that at least a portion of the inner conduit oscillates at the frequency; and
   a plasma emitting nozzle at a terminal end of the inner conduit, the nozzle recessed within the interior of the outer cylindrical tube from a terminal end of the outer cylindrical tube,
   wherein the outer cylindrical tube and the inner conduit are grounded at a rearward end that is opposite the terminal end of the inner conduit and the terminal end of the outer cylindrical tube and air received into the air intake serves as a dielectric insulator between the outer cylindrical tube and the inner conduit.

2. The atmospheric air plasma source of claim 1, further comprising a water sample subjected to plasma treatment at the terminal end of the outer cylindrical tube.

3. The atmospheric air plasma source of claim 2, further comprising a water conveying element fluid conduit in fluid communication with and extending from the rearward end of the inner conduit, wherein the fluid conduit draws water the water conveying element having a distal end extending beyond the terminal end of the outer cylindrical tube for drawing liquid from a liquid the water sample subjected to under plasma treatment and a fluid pump drives the drawn water through the fluid conduit and the inner conduit to the plasma emitting nozzle.

4. The atmospheric air plasma source of claim 1, further comprising a housing around the outer cylindrical tube and having an open distal end extending beyond the terminal end of the outer cylindrical tube.

5. The atmospheric air plasma source of claim 4, further comprising at least one floatation element configured to provide buoyancy to the housing with such that the open distal end of the housing is in contact with and sealed with a surface of a liquid under treatment.

6. The atmospheric air plasma source of claim 1, further comprising multiple identical air plasma sources driven in parallel with a common power supply.

* * * * *